United States Patent
Hayashi et al.

(10) Patent No.: US 7,773,345 B2
(45) Date of Patent: Aug. 10, 2010

(54) CARRIAGE FOR DISK DEVICE

(75) Inventors: Takeo Hayashi, Kawasaki (JP); Masao Hanya, Aiko-gun (JP); Tatsuhiko Nishida, Aiko-gun (JP)

(73) Assignees: Toshiba Storage Device Corporation, Tokyo (JP); NHK Spring Co., Ltd., Yokohama-Shi (JP)

( * ) Notice: Subject to any disclaimer, the term of this patent is extended or adjusted under 35 U.S.C. 154(b) by 647 days.

(21) Appl. No.: 11/820,465

(22) Filed: Jun. 19, 2007

(65) Prior Publication Data

US 2007/0291416 A1    Dec. 20, 2007

(30) Foreign Application Priority Data

Jun. 20, 2006    (JP) .............................. 2006-170394

(51) Int. Cl.
G11B 5/55    (2006.01)
(52) U.S. Cl. .................................................. 360/265.9
(58) Field of Classification Search .............. 360/265.9, 360/97.01, 244.2, 244.9
See application file for complete search history.

(56) References Cited

U.S. PATENT DOCUMENTS

| | | | | |
|---|---|---|---|---|
| 7,064,932 B1 * | 6/2006 | Lin et al. | .................. | 360/265.9 |
| 7,110,223 B2 * | 9/2006 | Shimizu et al. | .......... | 360/265.9 |
| 7,349,183 B2 * | 3/2008 | Oh et al. | .................. | 360/244.2 |
| 7,460,340 B2 * | 12/2008 | Tanizawa et al. | ......... | 360/265.8 |
| 7,545,607 B2 * | 6/2009 | Shimizu et al. | .......... | 360/265.7 |
| 7,586,714 B2 * | 9/2009 | Watadani et al. | ......... | 360/244.8 |
| 2005/0152070 A1 | 7/2005 | Funabashi et al. | | |

FOREIGN PATENT DOCUMENTS

| | | |
|---|---|---|
| JP | 05-325459 A | 12/1993 |
| JP | 2002-170345 A | 6/2002 |
| JP | 2003-173643 A | 6/2003 |
| JP | 2003-228933 A | 8/2003 |
| JP | 2004-95076 A | 3/2004 |

OTHER PUBLICATIONS

Japanese Office Action dated Jul. 7, 2009 and English translation thereof issued in a counterpart Japanese Application No. 2006-170394.

* cited by examiner

*Primary Examiner*—Angel A. Castro
(74) *Attorney, Agent, or Firm*—Frishauf, Holtz, Goodman & Chick, P.C.

(57) ABSTRACT

A carriage for a disc device, which has a top arm, bottom arm, and mid arm, has a main mode, end arm mode, and mid arm mode as a frequency response obtained when subjected to a vertical shake. In the main mode, all of the top, bottom, and mid arms swing at a first frequency within the same phase in a primary bending mode. In an end arm mode, the top and bottom arms swing at a second frequency higher than the first frequency within opposite phases and with an amplitude larger than that of the mid arm. In the mid arm mode, the mid arm swings at a third frequency having a difference of 50 Hz or less from the second frequency within the same phase as in the main mode, and the top and bottom arms swing within the phase opposite from that in the main mode.

18 Claims, 11 Drawing Sheets

CARRIAGE FOR DISK DEVICE

CROSS-REFERENCE TO RELATED APPLICATIONS

This application is based upon and claims the benefit of priority from prior Japanese Patent Application No. 2006-170394, filed Jun. 20, 2006, the entire contents of which are incorporated herein by reference.

BACKGROUND OF THE INVENTION

1. Field of the Invention

This invention relates to a carriage for a hard disc device (HDD) used in an information processing apparatus, such as a personal computer.

2. Description of the Related Art

A hard disc device (hereinafter referred to simply as the disc device) is used in an information processing apparatus, such as a personal computer. The disc device comprises magnetic disc for use as a recording medium, a carriage provided with a suspension, a positioning motor for driving the carriage, a box-shaped base, etc. The base contains therein the disc, carriage, positioning motor, etc.

A magnetic head for access to information for the magnetic disc is provided on the distal end portion of the suspension. The "access" described herein implies writing or reading data to or from the disc. The carriage of the disc device is rotated by the positioning motor. Information is read or written by means of the magnetic head that is situated in a target position on the disc.

For example, a 2.5-inch disc device has two discs for use as recording media. The carriage comprises an arm member including a top arm, a bottom arm, and a mid arm provided between the top and bottom arms. One suspension is attached to each of the top and bottom arms. A pair of suspensions are attached to the mid arm so that they are oriented oppositely from each other. A slider that constitutes a magnetic head is mounted on the distal end portion of each suspension. One such suspension is described in Jpn. Pat. Appln. KOKAI Publication No. 2003-173643 or No. 2004-95076.

The top, bottom, and mid arms of the arm member have their appropriate modes (resonance frequencies). The arms swing when a shock is applied to the carriage. In order to improve the resistance of the disc device against the shock during the operation of read or write (hereinafter referred to simply as the operational shock resistance), it is desirable to minimize the swings of the arms when the shock is applied.

As a small, high-integration disc device, such as a 2.5-inch hard disc device, is made thinner and lighter in weight, it becomes more difficult to enhance the modes (resonance frequencies) of the base and the arms. In the disc device of this type, it is essential to effectively suppress the swings of the arms with respect to a short-duration shock that is applied in a short period of time (e.g., 0.4 msec or thereabouts), in particular. Since the arm modes can be enhanced only limitedly, however, some means has been required to improve the operational shock resistance.

BRIEF SUMMARY OF THE INVENTION

The object of this invention is to provide a carriage for a disc device capable of being improved in operational shock resistance.

According to the invention, there is provided a carriage for a disc device, fixed to a base of the disc device, the carriage comprising an arm member including a top arm, a bottom arm, and at least one mid arm provided between the top and bottom arms, a rotary support portion which supports the arm member for rotation, and at least one suspension which is attached to the top, bottom, or mid arm and on which a head for access to information for a disc is mounted, the carriage having, with respect to a frequency response obtained when fixed to the base or a member equivalent to the base, a main mode in which all of the top, bottom, and mid arms swing at a first frequency within the same phase in a primary bending mode, an end arm mode in which the top and bottom arms swing at a second frequency higher than the first frequency within opposite phases and with an amplitude larger than that of the mid arm, and a mid arm mode in which the mid arm swings at a third frequency which has a difference of 50 Hz or less from the second frequency within the same phase as in the main mode and both the top and bottom arms swing within the phase opposite from that in the main mode.

The aforesaid frequency response can be realized by changing the shape of the carriage and the shape, thickness, weight distribution, gravity center position, material, etc. of each arm. Alternatively, a desired frequency response may be obtained by attaching an adjustment component to the carriage.

The "same phase" described herein is a concept that implies complete coincidence in phase, though it involves some phase shift. Further, the "opposite phases" is a concept that implies complete opposition in phase, although it involves some opposite phase shift.

If the carriage for a disc device of the present invention is subjected to a shock in a total frequency band that contains the first, second, and third frequencies, the top and bottom arms behave in the following manner. More specifically, a sub-mode is generated as a combination of the end arm mode and the mid arm mode. In this sub-mode, the top and bottom arms are urged to swing within the same phase with each other and within the phase opposite from that in the main mode. Thus, a damping effect is exhibited against swings of the top and bottom arms in the main mode.

The top and bottom arms are provided with only one suspension each. In some cases, each of these arms may be provided with a balance adjustment component in place of the suspension. The mid arm is provided with a pair of suspensions or balance adjustment components which are oriented oppositely from each other. In general, moreover, the bending stiffness of each of the top and bottom arms is lower than that of the mid arm. In other words, the top and bottom arms swing more easily than the mid arm. Thus, the swings of the top and bottom arms can be suppressed by the damping effect, so that the operational shock resistance of the carriage can be enhanced.

When a shock is applied to the disc device, according to the present invention, the end arm mode and the mid arm mode are combined to generate the sub-mode in which the phase is opposite from that in the main mode, and the damping effect is exhibited. The swings of the top and bottom arms can be suppressed by the damping effect, so that the operational shock resistance of the disc device can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of this invention will now be described with reference to FIGS. 1 to 6.

Figure 1:
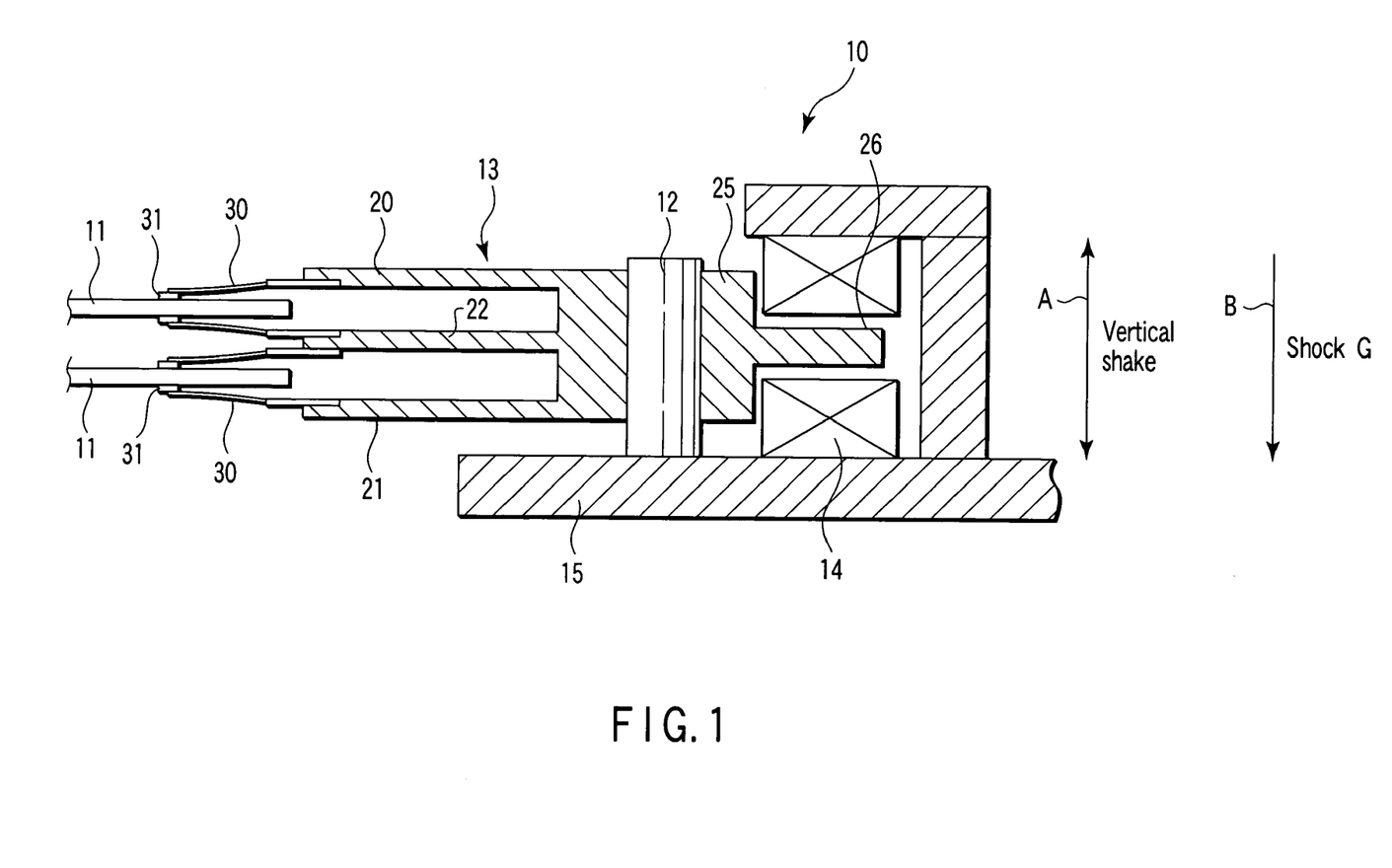
FIG. 1 is a sectional view typically showing a part of a disc device having a carriage according to a first embodiment of the invention.

A hard disc device (HDD) 10 shown in FIG. 1 has two discs 11 that function as recording media, a carriage 13 rotatable around a shaft 12, a positioning motor 14, etc. The carriage 13 is turned around the shaft 12 by the positioning motor 14. The discs 11, carriage 13, and positioning motor 14 are housed in a box-shaped base 15 (part of which is shown in FIG. 1).

Figure 2:
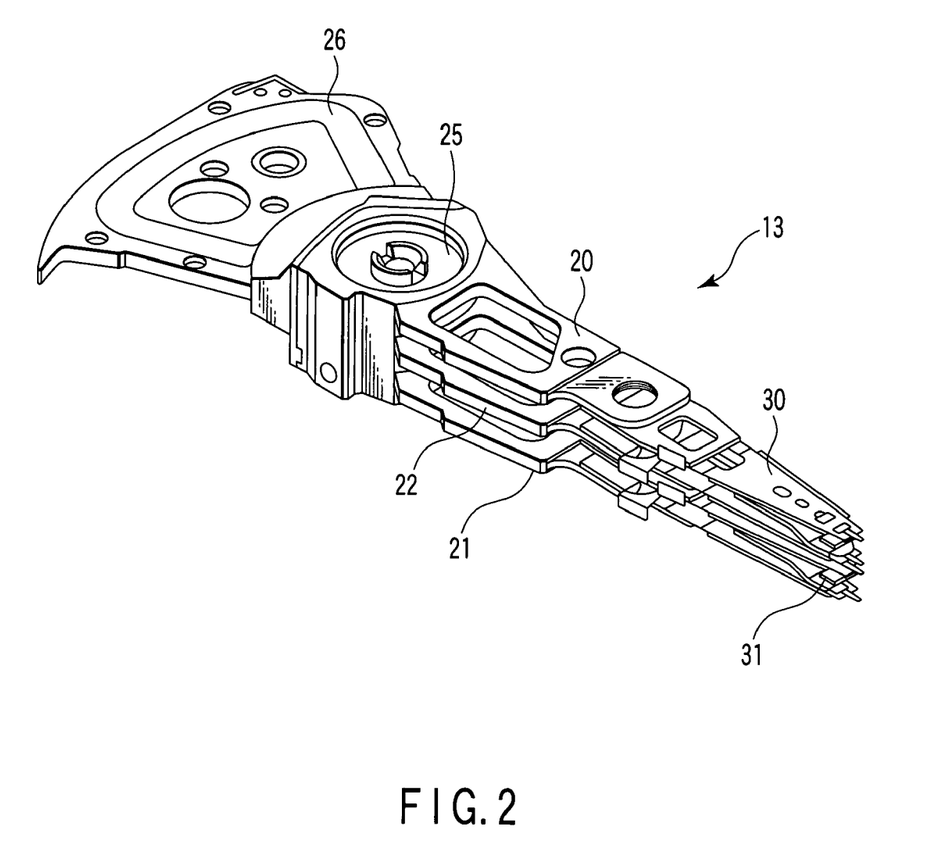
FIG. 2 is a perspective view of the carriage shown in FIG. 1.

The carriage 13 comprises an arm member, which includes a top arm 20 situated on the upper side of FIG. 1, a bottom arm 21 situated on the lower side of FIG. 1, and a mid arm 22 situated between the arms 20 and 21. The top and bottom arms 20 and 21 may be referred to collectively as "end arms", in some cases. As shown in FIG. 2, moreover, the carriage 13 comprises a rotary support portion 25, which includes a rolling bearing, and an electromagnetic drive coil 26.

One suspension 30 is attached to the distal end portion of the top arm 20. Another suspension 30 is also attached to the distal end portion of the bottom arm 21. A pair of suspensions 30 are attached to the distal end portion of the mid arm 22. The paired suspensions 30 are attached individually to one surface and the other surface of the mid arm 22 so that they are oriented oppositely from each other. A slider 31 that constitutes a head (magnetic head) is mounted on the distal end portion of each suspension 30. When each disc 11 rotates at high speed, an air bearing is formed between the disc 11 and the slider 31, and the slider 31 rises slightly above the disc 11.

Each slider 31 is provided with an element (not shown) that functions as a transducer for writing and reading data to and from the disc 11. As the carriage 13 is turned by the positioning motor 14, the suspensions 30 simultaneously move in the radial direction of the discs 11. Thus, each slider 31 moves to a desired track of its corresponding disc 11.

The suspension 30 that is attached to the top arm 20 faces the upper surface of the disc 11 on the upper side of FIG. 1. The suspension 30 that is attached to the bottom arm 21 faces the lower surface of the disc 11 on the lower side of FIG. 1. The pair of suspensions 30 that are attached individually to the upper and lower surfaces of the mid arm 22 face the lower surface of the upper disc 11 and the upper surface of the lower disc 11, respectively.

In the carriage 13 of the present embodiment, the shape, stiffness, thickness, gravity center position, etc. of each of the arms 20, 21 and 22 are set so that a main mode (Mode 1), an end arm mode (Mode 2), and a mid arm mode (Mode 3) are established at first, second, and third frequencies, respectively, which will be described below. A desired frequency response can be realized by changing the shape, material, etc. of the carriage 13.

In the main mode (Mode 1), the arms 20, 21 and 22 swing at the first frequency within the same phase in a primary bending mode (first bending mode) when the carriage 13 is vertically shaken in the direction of arrow A of FIG. 1 in a predetermined frequency band by a vibration tester.

Figure 3A:
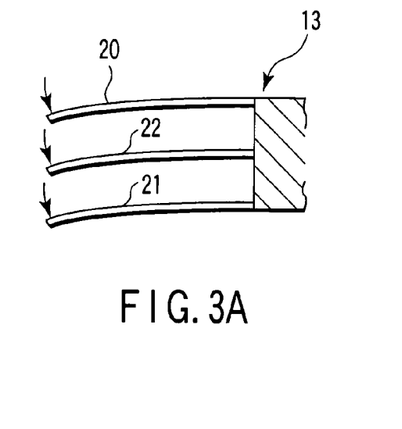
FIG. 3A is a side view showing a first state of arms in a main mode of the carriage.
Figure 3B:
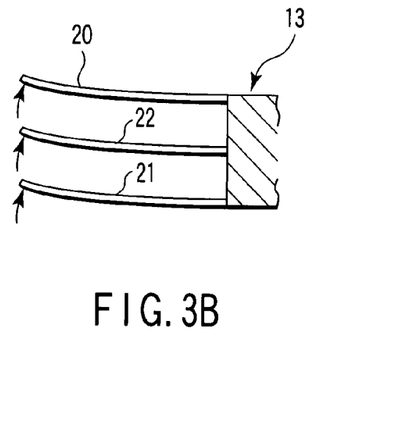
FIG. 3B is a side view showing a second state of the arms in the main mode.

FIGS. 3A and 3B typically show the respective behaviors of the arms 20, 21 and 22 in the main mode. In the main mode, all the arms 20, 21 and 22 move in a second direction within the same phase, as shown in FIG. 3B, after they are moved in a first direction within the same phase, as shown in FIG. 3A. Thus, the carriage 13 swings heavily.

In the end arm mode (Mode 2), the top and bottom arms 20 and 21 swing within opposite phases and with an amplitude larger than that of the mid arm 22 at the second frequency that is higher than the first frequency.

Figure 4A:
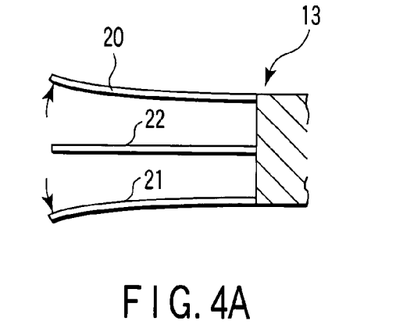
FIG. 4A is a side view showing a first state of the arms in an end arm mode of the carriage.
Figure 4B:
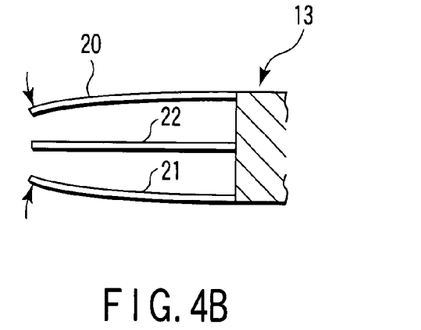
FIG. 4B is a side view showing a second state of the arms in the end arm mode.

FIGS. 4A and 4B typically show the respective behaviors of the arms 20, 21 and 22 in the end arm mode. In the end arm mode, the top and bottom arms 20 and 21 move in the second and first directions, respectively, as shown in FIG. 4B, after they are moved in the first and second directions, respectively, as shown in FIG. 4A. The swing of the mid arm 22 is smaller than those of the top and bottom arms 20 and 21.

In the mid arm mode (Mode 3), the mid arm 22 swings substantially within the same phase as in the main mode at the third frequency that has a difference of 50 Hz or less from the second frequency, and both the top and bottom arms 20 and 21 swing within the phase opposite from that in the main mode. Although the third frequency is a little higher than the second frequency, they are approximate to each other.

Figure 5A:
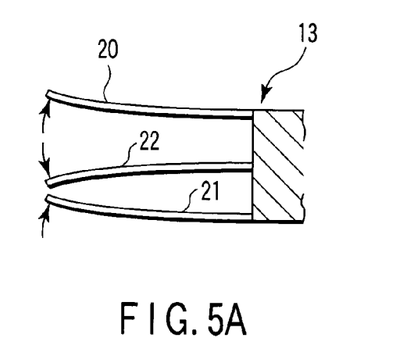
FIG. 5A is a side view showing a first state of the arms in a mid arm mode of the carriage.
Figure 5B:
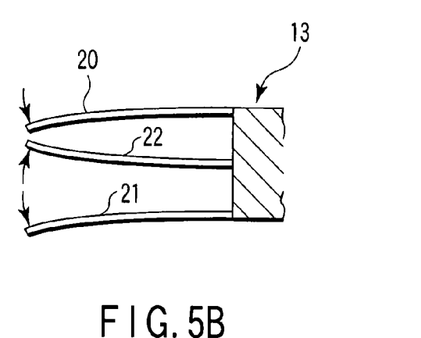
FIG. 5B is a side view showing a second state of the arms in the mid arm mode.

FIGS. 5A and 5B typically shows the respective behaviors of the arms 20, 21 and 22 in the mid arm mode. In the mid arm mode, as shown in FIG. 5A, the top and bottom arms 20 and 21 move in the first direction, while the mid arm 22 moves in the second direction. As shown in FIG. 5B, thereafter, the top and bottom arms 20 and 21 individually move in the second direction, and the mid arm 22 in the first direction. The swing of the mid arm 22 may be greater than that in the end arm mode, in some cases.

Figure 6:
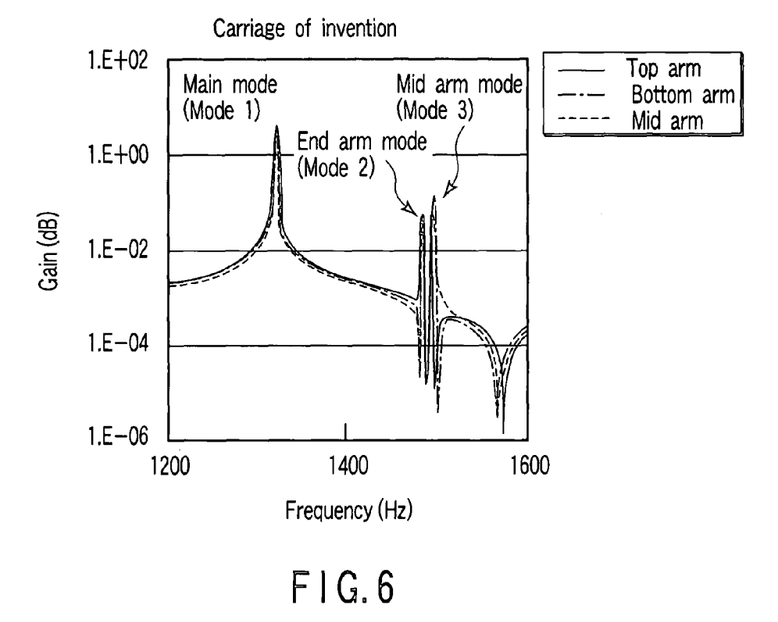
FIG. 6 is a diagram showing the frequency response of the carriage of the first embodiment of the invention.

FIG. 6 shows the frequency response of the carriage 13 of the present embodiment. In determining the frequency response, according to the present embodiment, the drive coil 26, suspension 30, etc. are attached to the carriage 13, and the measurement is made in a fixed state that is equivalent to the state for attachment to an actual disc device. Alternatively, the measurement may be made with the carriage 13 mounted on the base 15 of the disc device. More specifically, the frequency response stated herein is measured with the carriage 13 fixed to the base 15 or a member (e.g., mounting portion of the vibration tester) that is equivalent to the base 15.

In FIG. 6, the first frequency for the main mode (Mode 1) is set to, for example, 1,319 Hz. The second frequency for the end arm mode (Mode 2), which is higher than the first frequency, is set to, for example, 1,483 Hz. The third frequency for the mid arm mode (Mode 3) is set to, for example, 1,496 Hz. In this example, the difference between the second and third frequencies is only 13 Hz. As shown in FIG. 6, therefore, waveforms for the end and mid arm modes partially overlap each other.

Figure 7:
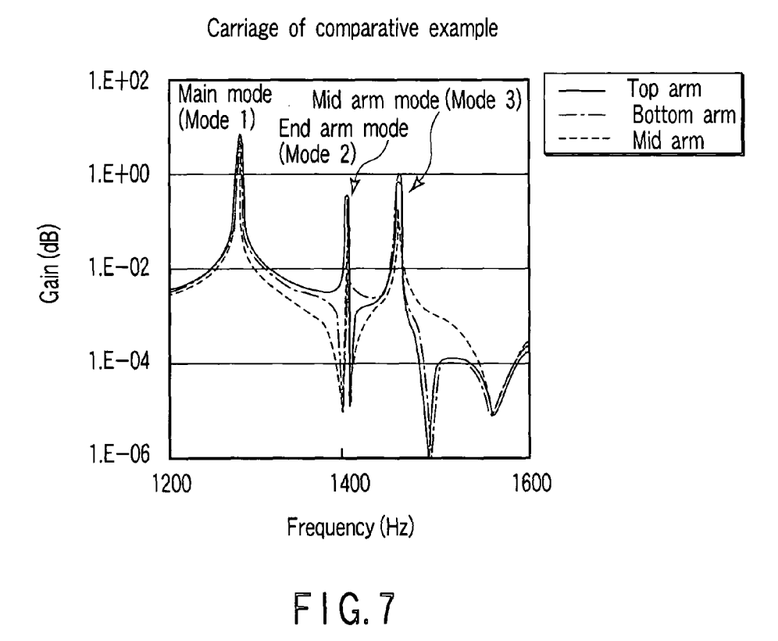
FIG. 7 is a diagram showing the frequency response of a carriage according to a comparative example.

FIG. 7 shows the frequency response of a carriage according to a comparative example. Frequencies for the main mode (Mode 1), end arm mode (Mode 2), and mid arm mode (Mode 3) of the comparative example are 1,281 Hz, 1,405 Hz and 1,464 Hz, respectively. The difference between the frequencies for the end and mid arm modes is as large as 59 Hz. Therefore, waveforms for the end and mid arm modes are completely separated from each other.

An ordinary shock, unlike a vertical shake, contains various frequency components. Specifically, frequency components observed when a shock is applied include the first, second, and third frequencies. According to an investigation by the inventors hereof, it was found that a sub-mode opposite in phase to an original main mode was established when a shock in the direction indicated by arrow B in FIG. 1 was applied to the carriage 13 of the present embodiment having the characteristics shown in FIG. 6. Based on this sub-mode, a damping effect is exhibited to suppress swings of the top and bottom arms 20 and 21.

Thus, according to the carriage 13 of the present embodiment, the end and mid arm modes resemble each other with a difference of 50 Hz or less, as shown in FIG. 6. When a shock is applied, therefore, the end and mid arm modes are united together to generate the sub-mode that is opposite in phase to the main mode. In this sub-mode, the top and bottom arms 20 and 21 are urged to swing within the same phase with each other and within the phase opposite from that in the main mode. Based on this sub-mode, a damping effect is exhibited against swings of the top and bottom arms 20 and 21 in the main mode. This damping effect suppresses the swings of the arms 20 and 21.

FIG. 7 shows the characteristics of the carriage according to the comparative example. In this comparative example, the difference between the frequencies for the end and mid arm modes exceeds 50 Hz. In the case of this comparative example, no damping effect based on the sub-mode was able to be recognized. A damping effect gradually developed as the difference between the second and third frequencies for the end and mid arm modes decreased from the vicinity of 50 Hz. It was confirmed that the closer the frequency difference was to 0 Hz, the better the damping effect obtained was.

Arms of a carriage of a 2.5-inch HDD, for example, are generally designed so that their resonance frequency is 1.4 kHz or thereabouts. In general, moreover, the damping effect is intended for a half-wave sine shock of about 0.5 msec to 1 msec. In the 2.5-inch HDD, therefore, an effective damping effect can be obtained with use of the configuration of this invention. The same damping effect can be also obtained in a larger disc device, such as a 3.5-inch HDD. The number of arms of the carriage is not limited to three, but the same damping effect can be expected from a storage device that has a plurality of arms if the present invention is applied to it.

The pair of suspensions 30 are attached to the mid arm 22 so that they are oriented oppositely from each other. If the mid arm 22 swings, therefore, the suspensions 30 serve to suppress the swing. On the other hand, the top and bottom arms 20 and 21 are provided with only one suspension 30 each. In general, moreover, the bending stiffness of each of the arms 20 and 21 is lower than that of the mid arm 22. Accordingly, the top and bottom arms 20 and 21 swing more easily than the mid arm 22. Thus, the operational shock resistance of the entire carriage 13 can be improved by suppressing the swings of the top and bottom arms 20 and 21.

Figure 8:
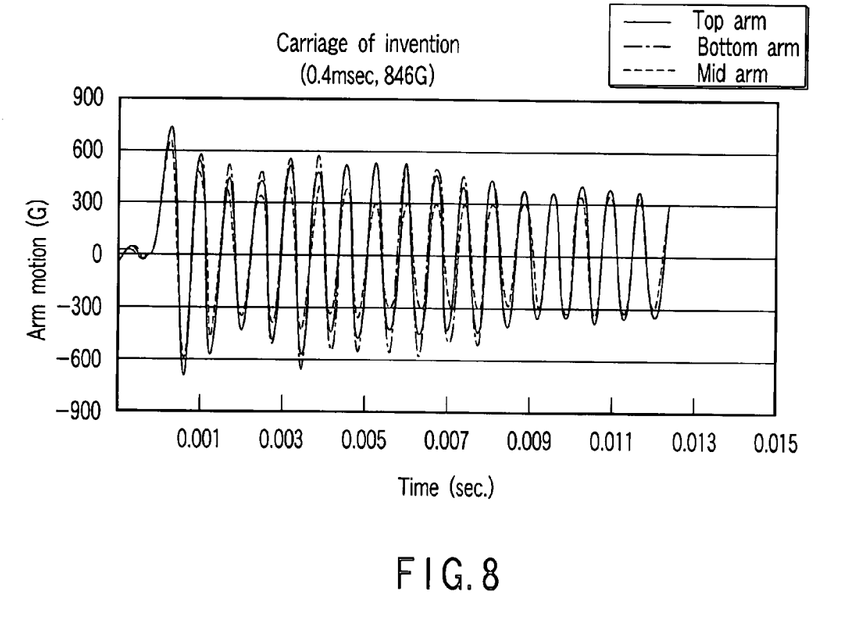
FIG. 8 is a diagram showing the respective behaviors of the arms caused when a shock is applied to the carriage with the characteristics shown in FIG. 6.

FIG. 8 shows the respective time-based behaviors of the arms 20, 21 and 22 caused when a shock is applied to the carriage 13 (with the characteristics shown in FIG. 6) of the present embodiment. In the carriage 13 of the present embodiment, as seen from FIG. 8, the amplitudes of the top and bottom arms 20 and 21 are suppressed. Thus, in the carriage 13 of the present embodiment, the swings of the top and bottom arms 20 and 21 can be suppressed by the aforesaid damping effect that is produced when a shock is applied. In consequence, the operational shock resistance of the disc device 10, as well as that of the carriage 13, can be improved.

Figure 9:
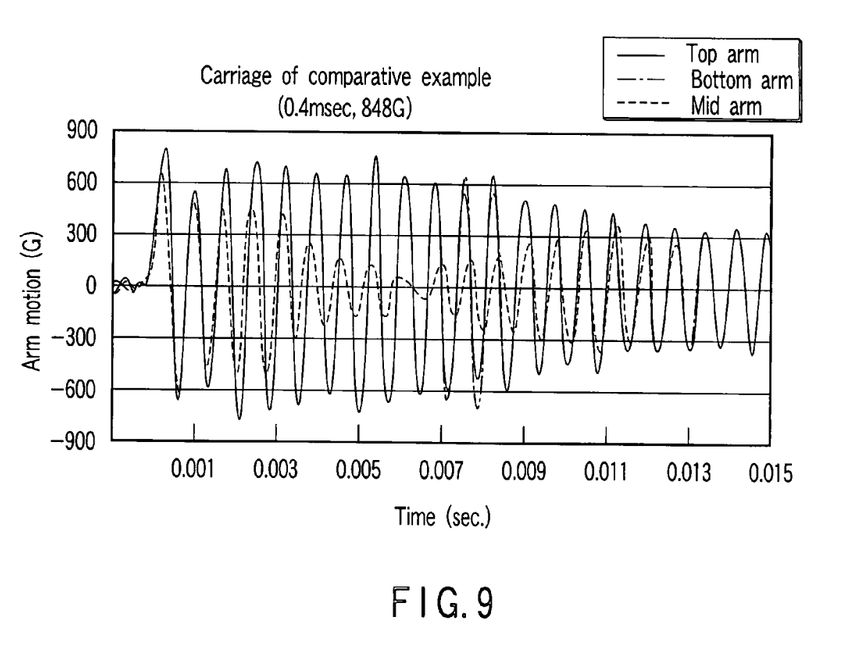
FIG. 9 is a diagram showing the respective behaviors of the arms caused when a shock is applied to the carriage with the characteristics shown in FIG. 7.

FIG. 9 shows the respective time-based behaviors of the arms caused when a shock is applied to the carriage (with the characteristics shown in FIG. 7) of the comparative example. In the carriage of the comparative example, as seen from FIG. 9, the amplitudes of top and bottom arms are too large to ensure satisfactory operational shock resistance.

Figure 10:
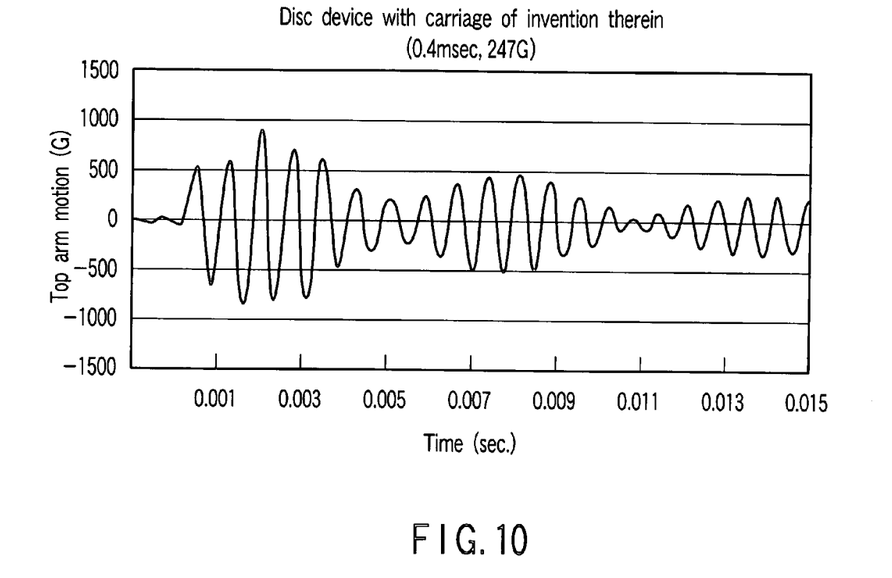
FIG. 10 is a diagram showing the behavior of a top arm caused when a shock is applied to the disc device in which the carriage with the characteristics shown in FIG. 6 is incorporated.

FIG. 10 shows the time-based behavior of the top arm 20 caused when a shock is applied to the disc device 10 in which the carriage 13 (with the characteristics shown in FIG. 6) of the present embodiment is incorporated. In the disc device 10 of the present embodiment, as seen from FIG. 10, the amplitude of the top arm 20 is small, and the vibration is attenuated in a short period of time. The same tendency was also observed for the bottom arm 21. Since the mid arm 22 can swing less easily than the top and bottom arms 20 and 21 for the aforesaid reason, the amplitude was small, and the vibration converged in a short period of time.

Figure 11:
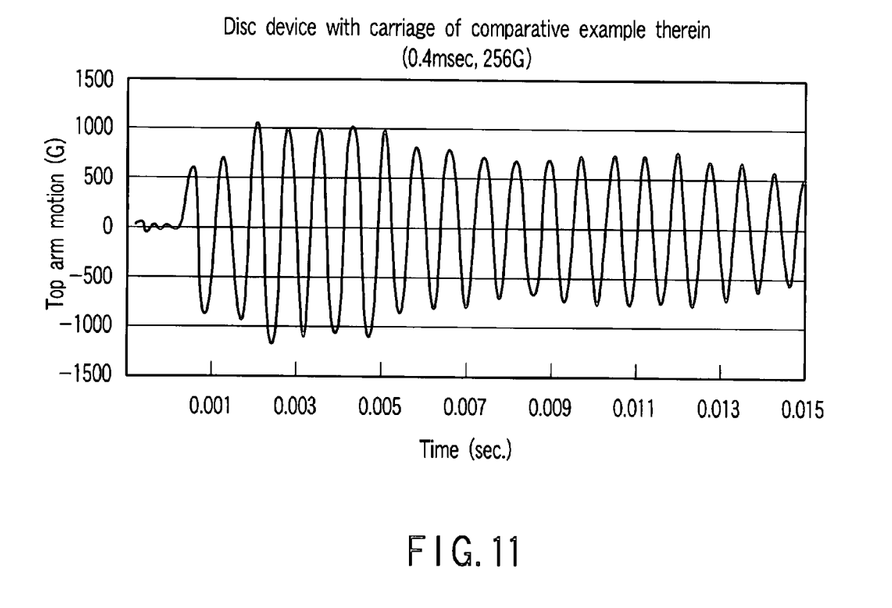
FIG. 11 is a diagram showing the behavior of a top arm caused when a shock is applied to a disc device in which the carriage with the characteristics shown in FIG. 7 is incorporated.

FIG. 11 shows the time-based behavior of the top arm caused when a shock is applied to a disc device in which the carriage (with the characteristics shown in FIG. 7) of the comparative example is incorporated. In the disc device of the comparative example, as seen from FIG. 11, the amplitude of the top arm is large, and the vibration cannot be easily attenuated. The same tendency was also observed for the bottom arm. Thus, the operational shock resistance was found to be poor.

In the carriage 13 of the first embodiment described above, any of the arms 20, 21 and 22 is provided with the suspension 30. However, the same operational shock resistance of the carriage 13 of the foregoing embodiment can be also obtained from a carriage in which at least one of the arms 20, 21 and 22 is not provided with the suspension 30.

Figure 12:
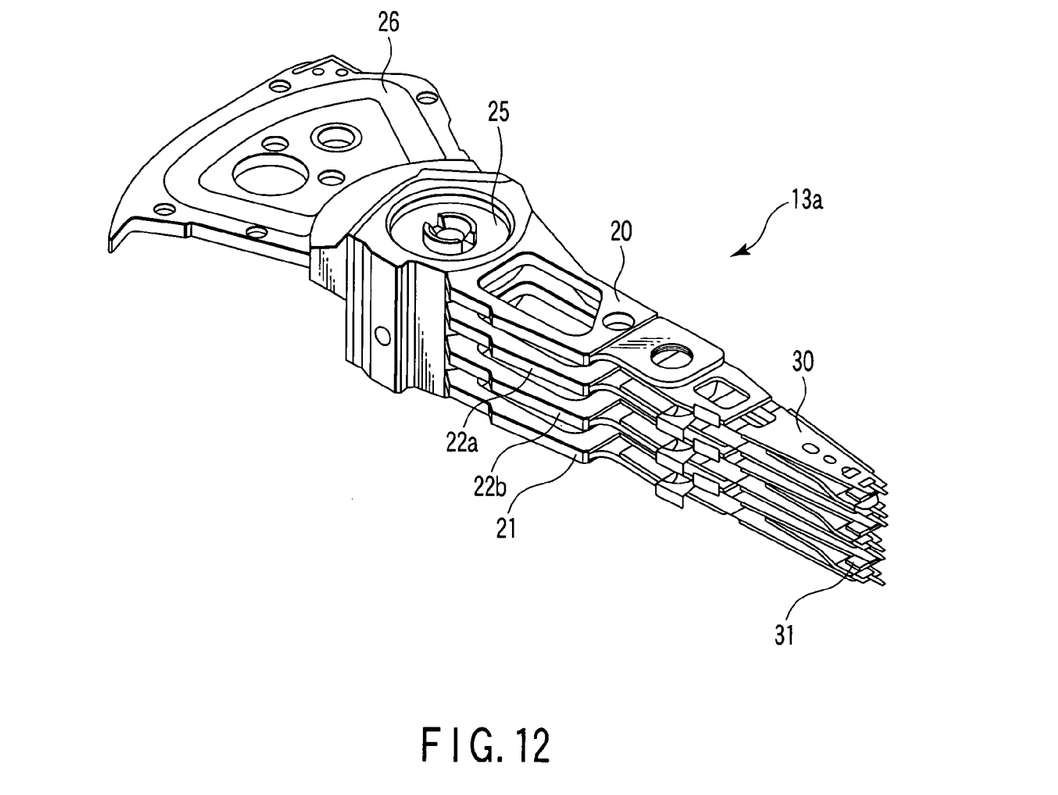
FIG. 12 is a perspective view of a carriage according to a second embodiment of the invention.

FIG. 12 shows a carriage 13a according to a second embodiment of the invention. In this carriage 13a, two mid arms 22a and 22b are located between a top arm 20 and a bottom arm 21. The thickness, shape, and material of each of the arms 20, 21, 22a and 22b of the carriage 13a are adjusted so that the difference between the frequencies for the end and mid arm modes is within 50 Hz. Other parts of the carriage 13a are constructed substantially in the same manner as those of the carriage 13 according to the first embodiment. The carriage 13a of this embodiment, thus having the two mid arms 22a and 22b, can also display the same operational shock resistance as that of the carriage 13 of the first embodiment.

Figure 13:
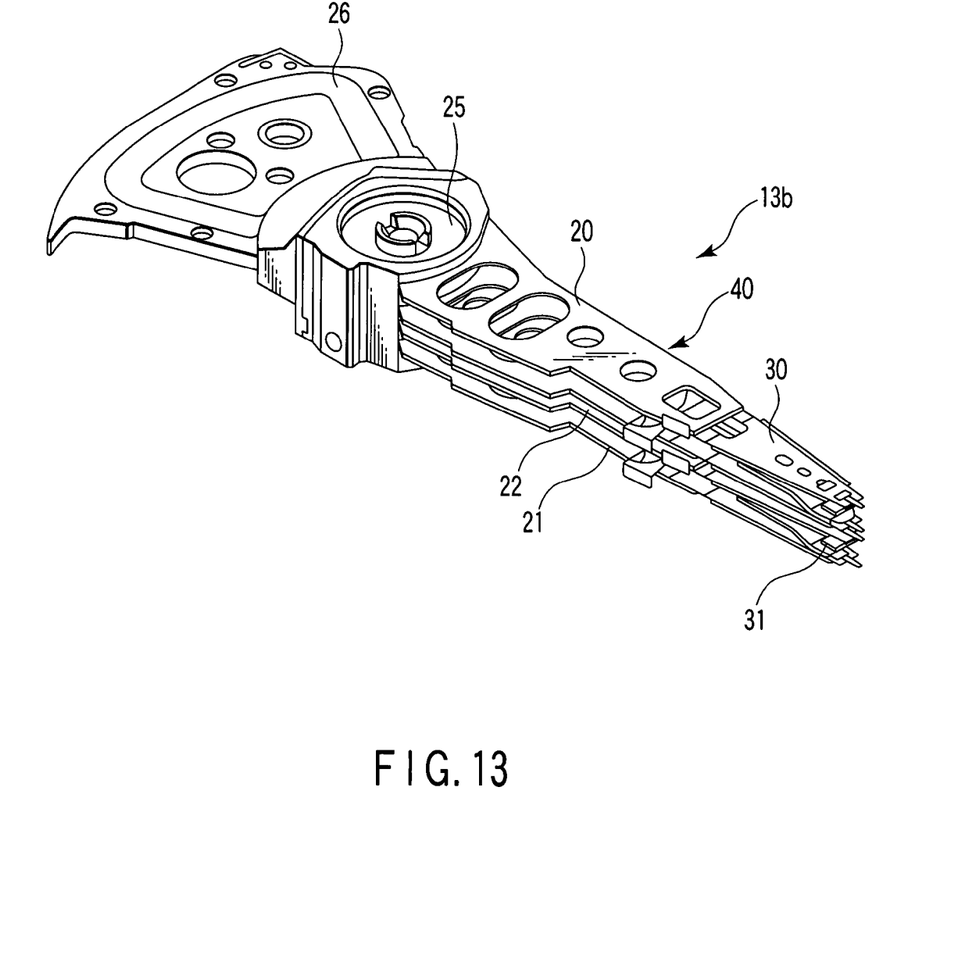
FIG. 13 is a perspective view of a carriage according to a third embodiment of the invention.

FIG. 13 shows a carriage 13b according to a third embodiment of the invention. In this carriage 13b, at least one of arms, including a top arm 20, a bottom arm 21, and a mid arm 22, is formed of a component 40 that is integral with a suspension 30. Other parts of the carriage 13b are constructed substantially in the same manner as those of the carriage 13 according to the first embodiment. The thickness, shape, and material of each of the arms 20, 21, and 22 of the carriage 13b are also adjusted so that the difference between the frequencies for the end and mid arm modes is within 50 Hz. The carriage 13b of this embodiment, thus having the integral component 40, can also display the same operational shock resistance as that of the carriage 13 of the first embodiment.

Figure 14:
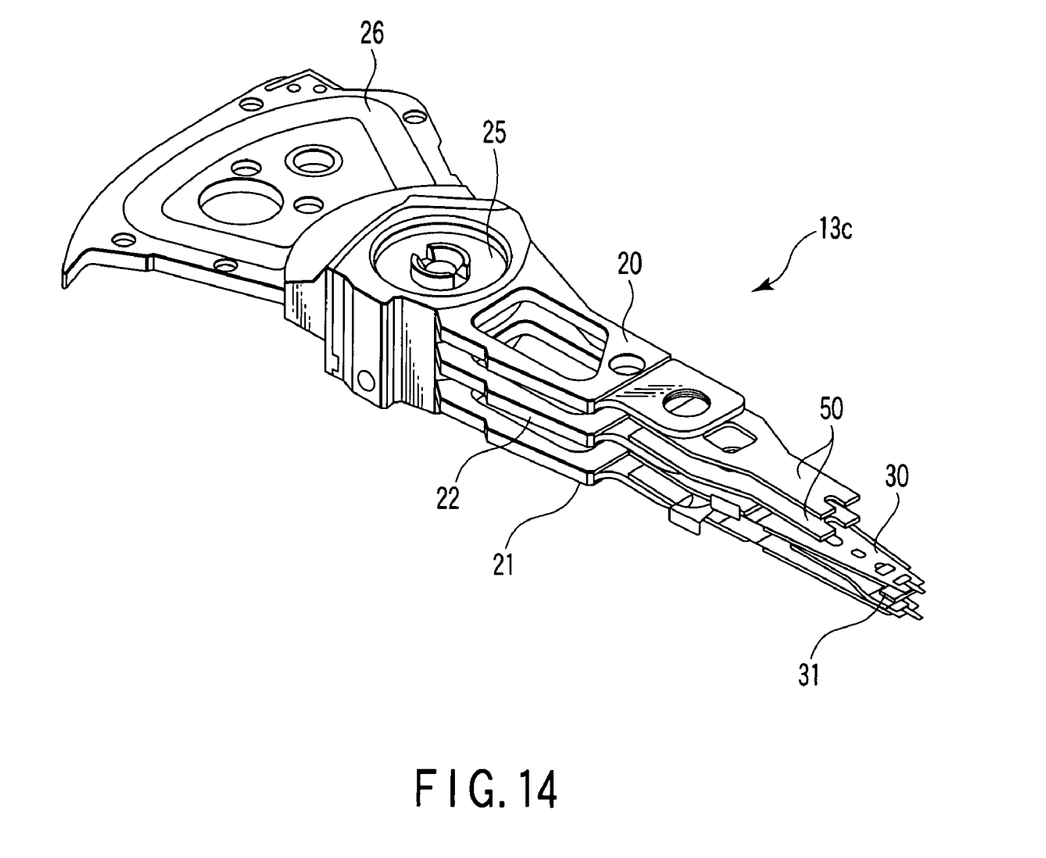
FIG. 14 is a perspective view of a carriage according to a fourth embodiment of the invention.

FIG. 14 shows a carriage 13c according to a fourth embodiment of the invention. In this carriage 13c, a metallic balance adjustment component 50, not a suspension 30, is attached to that part of each of a top arm 20 and a bottom arm 21 of the carriage 13c to which the suspension 30 is to be attached. The balance adjustment component 50 may be attached to any one of arms 20, 21 and 22. It may alternatively be plastic. The thickness, shape, and material of the balance adjustment component 50 of the carriage 13c are adjusted so that the difference between the frequencies for the end and mid arm modes is within 50 Hz. Other parts of the carriage 13c are constructed substantially in the same manner as those of the carriage 13 according to the first embodiment. The carriage 13c of this embodiment, thus having no suspension on a part of each arm, can also display the same operational shock resistance as that of the carriage 13 of the first embodiment.

Figure 15:
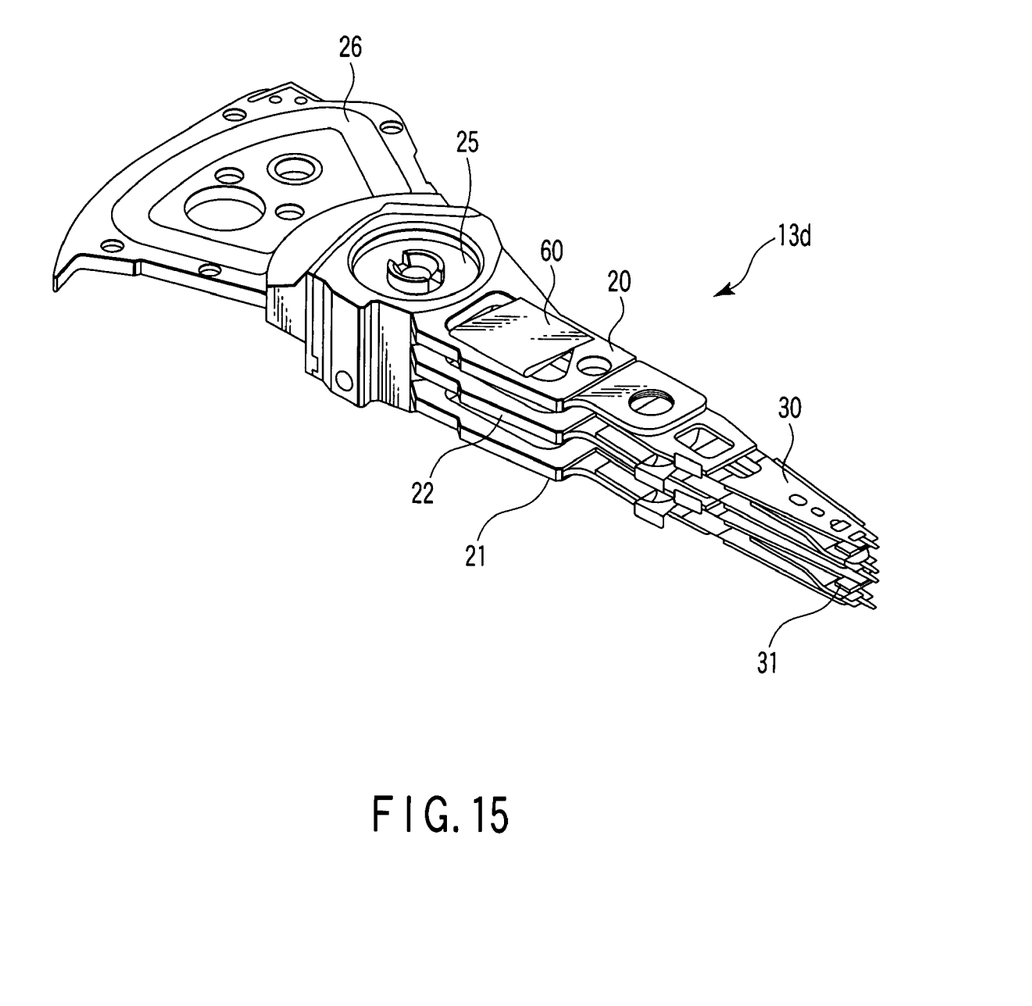
FIG. 15 is a perspective view of a carriage according to a fifth embodiment of the invention.

FIG. 15 shows a carriage 13d according to a fifth embodiment of the invention. In this carriage 13d, at least one of arms, including a top arm 20, a bottom arm 21, and a mid arm 22, is provided with an adjustment component 60 that is formed of a viscoelastic material. Alternatively, the adjustment component 60 may be metallic. The adjustment component 60 is pasted on at least one of the arms 20, 21 and 22 and serves for balance adjustment or vibration damping for the carriage 13d. The thickness, shape, and material of the adjustment component 60 of the carriage 13d are adjusted so that the difference between the frequencies for the end and mid arm modes is within 50 Hz. Other parts of the carriage 13d are constructed substantially in the same manner as those of the carriage 13 according to the first embodiment. The carriage 13d of this embodiment, thus having the adjustment component 60, can also display the same operational shock resistance as that of the carriage 13 of the first embodiment.

Figure 16:
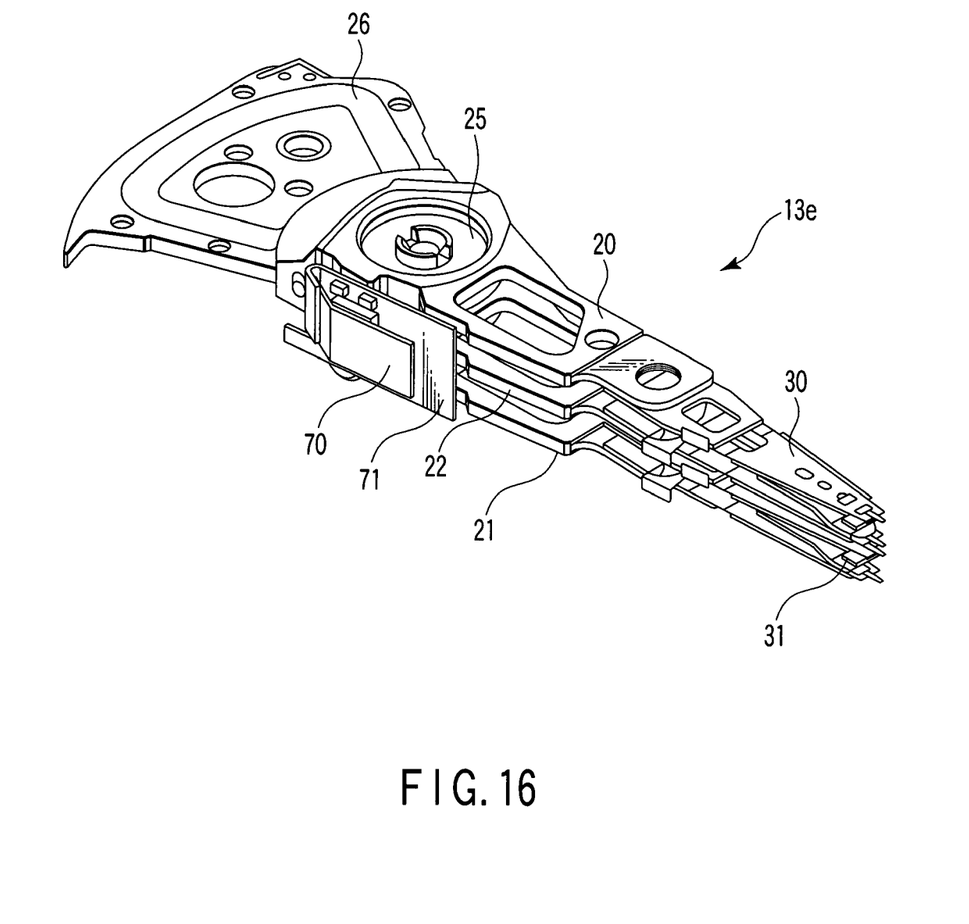
FIG. 16 is a perspective view of a carriage according to a sixth embodiment of the invention.

FIG. 16 shows a carriage 13e according to a sixth embodiment of the invention. A flexible printed circuit board (FPC) 70 is fixed to a side portion of the carriage 13e. The FPC 70 is fixed to the carriage 13e by means of a mounting component 71. The FPC 70 has a function to transmit a signal (signal for access to information) from a head including a slider 31 to a control circuit of a disc device. The position and method for fixing the FPC 70 of the carriage 13e, the area and method of contact between the FPC 70 and each arm, etc. are adjusted so that the difference between the frequencies for the end and mid arm modes is within 50 Hz. Other parts of the carriage 13e are constructed substantially in the same manner as those of the carriage 13 according to the first embodiment. This carriage 13e can also display the same operational shock resistance as that of the carriage 13 of the first embodiment.

Further, all or some of the embodiments described above may be combined with one another. It is to be understood, in carrying out the present invention, that the components of the carriage, including the top, bottom, and mid arms, may be variously modified without departing from the scope or spirit of the invention. Furthermore, the disc device may be oriented in any desired direction. For example, it may be used in a lateral or oblique posture.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carriage for a disc device, fixed to a base of the disc device, the carriage comprising:
    an arm member including a top arm, a bottom arm, and at least one mid arm provided between the top and bottom arms;
    a rotary support portion which supports the arm member for rotation; and
    at least one suspension which is attached to the top, bottom, or mid arm and on which a head for access to information for a disc is mounted,
    the carriage having, with respect to a frequency response obtained when fixed to the base or a member equivalent to the base, a main mode in which all of the top, bottom, and mid arms swing at a first frequency within the same phase in a primary bending mode, an end arm mode in which the top and bottom arms swing at a second frequency higher than the first frequency within opposite phases and with an amplitude larger than that of the mid arm, and a mid arm mode in which the mid arm swings at a third frequency which has a difference of 50 Hz or less from the second frequency within the same phase as in the main mode and both the top and bottom arms swing within the phase opposite from that in the main mode.

2. A carriage for a disc device according to claim 1, wherein the top arm and the bottom arm are provided with one suspension each, and the mid arm is provided with a pair of suspensions which are attached individually to one surface and the other surface of the mid arm so as to be oriented oppositely from each other.

3. A carriage for a disc device according to claim 2, wherein the bending stiffness of the mid arm is greater than those of the top arm and the bottom arm.

4. A carriage for a disc device according to claim 2, wherein at least one of the arms, including the top, bottom, and mid arms, is a component integral with the suspension.

5. A carriage for a disc device according to claim 2, wherein an adjustment component of a viscoelastic material is attached to at least one of the arms, including the top, bottom, and mid arms.

6. A carriage for a disc device according to claim 2, wherein a metallic or plastic adjustment component is attached to any other part of at least one of the arms, including the top, bottom, and mid arms, than that part thereof to which the suspension is attached.

7. A carriage for a disc device according to claim 2, wherein the carriage is fitted with an FPC for transmitting a signal from the head to a control circuit of the disc device.

8. A carriage for a disc device according to claim 1, wherein the bending stiffness of the mid arm is greater than those of the top arm and the bottom arm.

9. A carriage for a disc device according to claim 8, wherein at least one of the arms, including the top, bottom, and mid arms, is a component integral with the suspension.

10. A carriage for a disc device according to claim 8, wherein an adjustment component of a viscoelastic material is attached to at least one of the arms, including the top, bottom, and mid arms.

11. A carriage for a disc device according to claim 8, wherein a metallic or plastic adjustment component is attached to any other part of at least one of the arms, including the top, bottom, and mid arms, than that part thereof to which the suspension is attached.

12. A carriage for a disc device according to claim 8, wherein the carriage is fitted with an FPC for transmitting a signal from the head to a control circuit of the disc device.

13. A carriage for a disc device according to claim 1, wherein at least one of the arms, including the top, bottom, and mid arms, is a component integral with the suspension.

14. A carriage for a disc device according to claim 1, wherein the suspension is replaced with a metallic balance adjustment component which is attached to that part of at least one of the arms, including the top, bottom, and mid arms, to which the suspension is to be attached.

15. A carriage for a disc device according to claim 1, wherein the suspension is replaced with a plastic balance adjustment component which is attached to that part of at least one of the arms, including the top, bottom, and mid arms, to which the suspension is to be attached.

16. A carriage for a disc device according to claim 1, wherein an adjustment component of a viscoelastic material is attached to at least one of the arms, including the top, bottom, and mid arms.

17. A carriage for a disc device according to claim 1, wherein a metallic or plastic adjustment component is attached to any other part of at least one of the arms, including the top, bottom, and mid arms, than that part thereof to which the suspension is attached.

18. A carriage for a disc device according to claim 1, wherein the carriage is fitted with an FPC for transmitting a signal from the head to a control circuit of the disc device.

* * * * *